(12) United States Patent
Juszkiewicz et al.

(10) Patent No.: US 8,194,665 B2
(45) Date of Patent: Jun. 5, 2012

(54) DATA PACKET, METHOD, AND DEVICE OF TRANSMITTING PAYLOAD INFORMATION WITHIN AN EXTENDABLE HEADER

(75) Inventors: Henry E. Juszkiewicz, Nashville, TN (US); Hussein Sallam, Clarksville, MD (US)

(73) Assignee: Gibson Guitar Corp., Nashville, TN (US)

( * ) Notice: Subject to any disclaimer, the term of this patent is extended or adjusted under 35 U.S.C. 154(b) by 424 days.

(21) Appl. No.: 11/613,434

(22) Filed: Dec. 20, 2006

(65) Prior Publication Data

US 2008/0151891 A1  Jun. 26, 2008

(51) Int. Cl.
*H04L 12/56* (2006.01)
(52) U.S. Cl. .......... 370/392; 370/401; 370/474; 370/476
(58) Field of Classification Search .............. 370/395.63, 370/469, 474, 355, 376, 389, 320; 395/200.75, 395/200.68; 707/1–10, 203
See application file for complete search history.

(56) References Cited

U.S. PATENT DOCUMENTS

| | | | | |
|---|---|---|---|---|
| 6,094,525 | A * | 7/2000 | Perlman et al. | 709/245 |
| 6,353,169 | B1 | 3/2002 | Juszkiewicz et al. | 84/600 |
| 6,686,530 | B2 | 2/2004 | Juszkiewicz et al. | 84/600 |
| 6,788,707 | B1 | 9/2004 | Horton, Jr. et al. | |
| 7,171,433 | B2 * | 1/2007 | Wolfe et al. | 1/1 |
| 2002/0009090 | A1 | 1/2002 | Kalkunte et al. | |
| 2002/0067721 | A1 * | 6/2002 | Kye | 370/389 |
| 2002/0090007 | A1 * | 7/2002 | Kamiya et al. | 370/476 |
| 2002/0093955 | A1 | 7/2002 | Grand et al. | |
| 2004/0047353 | A1 * | 3/2004 | Umayabashi et al. | 370/395.63 |
| 2004/0141356 | A1 | 7/2004 | Gabrani et al. | |
| 2004/0141524 | A1 * | 7/2004 | Lee et al. | 370/469 |
| 2005/0102504 | A1 * | 5/2005 | Le et al. | 713/160 |
| 2005/0117571 | A1 * | 6/2005 | Dyke | 370/355 |
| 2006/0245424 | A1 * | 11/2006 | Ramanathan et al. | 370/389 |
| 2008/0192676 | A1 * | 8/2008 | Mantha | 370/320 |

OTHER PUBLICATIONS

IEEE Std 802.1Q-1998: IEEE Standards for Local and Metropolitan Area Networks: Virtual Bridged Local Area Networks. Published Mar. 8, 1999.

* cited by examiner

*Primary Examiner* — Robert Wilson
*Assistant Examiner* — Mohamed Kamara
(74) *Attorney, Agent, or Firm* — Bates & Bates, LLC

(57) ABSTRACT

The invention pertains to utilizing a data packet with a header extended to contain information dealing with the payload. Specifically, IEEE 802.1Q standard contains an extendable header which is normally utilized to contain information regarding a VLAN. However, these fields can also be utilized to provide information about the payload of the data packet. In this manner, networking devices which are primarily concerned with layer 2 data-link layer protocols can transmit information according to the information being transmitted by the packet.

34 Claims, 3 Drawing Sheets

DATA PACKET, METHOD, AND DEVICE OF TRANSMITTING PAYLOAD INFORMATION WITHIN AN EXTENDABLE HEADER

BACKGROUND OF THE INVENTION

The present invention relates generally to adapting and expanding standard networking and communication protocols such as the Ethernet protocol for example to carry, transfer, and utilize information specific to the payload at the lower networking layers such as the data link layer where important networking and switching decisions are made. The OSI Reference Model For Network Communication defines seven different layers of distinct and separate functionality. These layers are the physical layer, the data link layer, the network layer, the transport layer, the session layer, the presentation layer and the application layer. Most packet oriented communication protocols are designed with a packet header section that carries all the information implementing the first six layers defined in the OSI Reference Model and a payload section that carries the information related to the application layer implementation. Upon transferring information from a source to a destination, intermediate systems only utilize the lower three layers of the OSI protocol, the physical layer, the link layer and the network layer, to transfer data packets between systems. According to the standard, these layers primarily contain information on how to transfer a data packet to the destination from the source. Nowhere has the standard reference model or the most widely deployed implementations based on it such as the Ethernet standard heavily used to carry Internet traffic provided fields to contain information about the payload carried by each data packet in the lower layers.

In the past this shortcoming was not critical since the original function of the Internet was to transfer time insensitive text files. Thus a user did not care whether his email or even static images were received in a halting asynchronous manner. In addition, the original designers of the Internet gave little thought to Internet piracy and the consequences of permitting a user to transfer information across the Internet anonymously. What is required is a method and/or device which can provide information about the payload of the data packet that may be optionally utilized to identify the packets of certain application for special treatment by the network. The information required may also include information related to the source of the data packet and other information that may be utilized to facilitate the assertion and possible enforcement of intellectual property rights of the data being carried by the network at the data link level. The data link layer provides the functional and procedural means to transfer data between network entities. In fact, normally network entities are only concerned with the information in the data link layer or the network layer in order to transfer the packet to the destination. The information for the data link layer is contained within a data packet header. If one could provide a limited amount of critical application specific information in the packet header, networking devices could optionally use this data to get involved in policing the network traffic for pirated or illegal transfers of information that is transferred through the web or setting priorities of transfer according to the types of information that are forwarded by the network. Unfortunately most communications standards do not have provisions to perform this function. In fact, no field in the IEEE Ethernet protocol standard specifically provides for space to input the necessary information. Ethernet was designed to treat all packets anonymously and equally. In the past this was acceptable since all packets carried text data with weak ownership claims and intellectual property rights attached to them. This is no longer ideal for today's network that carries strongly owned audio, video, and other time sensitive media type data. This innovation focuses on creating provisions with the existing and widely adopted networking standards such as Ethernet for identifying certain networking traffic types for special treatment including but not limited to making deterministic forwarding decisions and prioritization decisions.

BRIEF SUMMARY OF THE INVENTION

The present invention relates generally to utilizing a data packet with an extendable header to provide application specific information, packet source information, and other information that may be helpful in flagging the packet for special processing. One example of an Ethernet protocol with an extendable header is the IEEE 802.1Q standard. Data packets formatted according to the IEEE 802.1Q protocol may contain one or more extra tags that extend the header. By providing a tagged frame for the data packet and configuring the data packet with sufficient additional tags to contain payload information bits, the user can provide information about the source and the type of data contained in the payload at the data link level to enable the optional implementation of special purpose networks capable of making application specific forwarding decisions. In this manner, special devices could be developed or configured to listen for the payload information bits contained within the extendable header to perform a number of new functions including forwarding priority and Internet policing functions.

Accordingly, one object of the present invention is to provide payload information at the header in general and at the data link level in particular.

Another object of the present invention is to provide source information at the header in general and the data link level in particular.

Yet another object of the present invention is to provide a method of policing Internet traffic and enforcing author asserted intellectual property ownership.

Still another object of the present invention is to provide a method of prioritizing the transfer of information through the Internet.

DETAILED DESCRIPTION OF THE INVENTION

Figure 1:
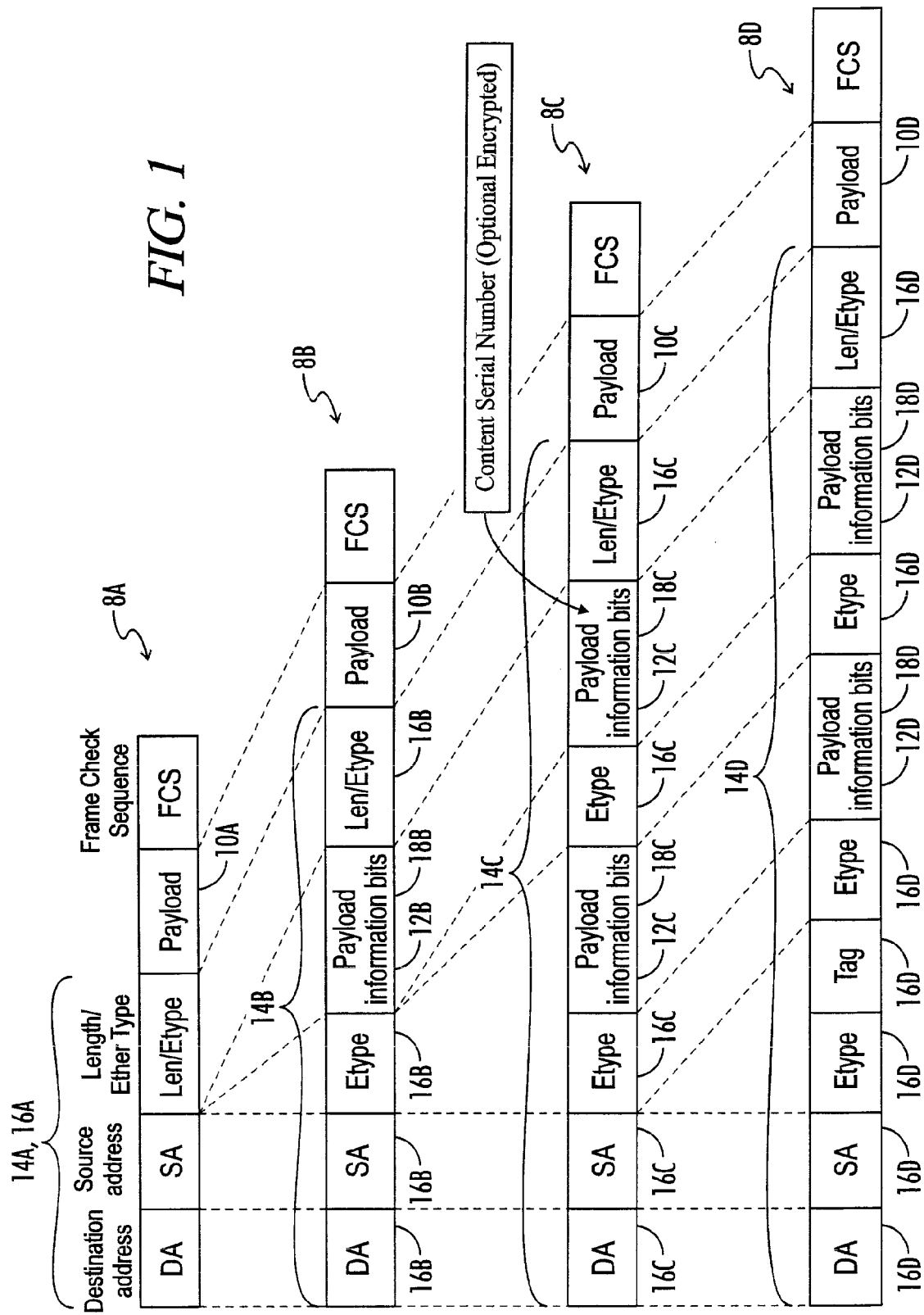
FIG. 1 is a view of a data packet with an extendable header. The first line of FIG. 1 shows the data packet with an extendable header wherein the extendable header has not been extended. The second line of FIG. 1 shows a data packet with the header having been extended by one field. The third line of FIG. 1 shows a data packet with an extendable header having been extended another frame and containing payload information bits. The fourth line of FIG. 1 shows a data packet having been extended by another field and containing payload information bits.

Referring now to FIG. 1, data packets 8A, 8B, 8C and 8D comprising payloads 10A, 10B, 10C and 10D and extendable headers 14A, 14B, 14C and 14D are shown. Each data packet 8A, 8B, 8C and 8D in FIG. 1 represents the same data packet except for the extension of the header. As is shown in the drawings, extendable headers 14A, 14B, 14C and 14D have at least one packet handling field 16A, 16B, 16C, 16D. Packet handling fields contain information normally present in the data link layer. As is shown, this information can consist of destination addresses, source addresses, and Ethernet type fields describing the presence and function of fields within the data link layer. Data packets 8B, 8C and 8D are a representation of data packet 8A wherein the header 14A has been extended by at least one payload information field 18 for containing the payload information bits 12. By extension of the header the applicant does not intend to imply that the data packet must first be in a short frame and then extended into a longer frame. While this is included in the definition, it is not the only definition of extension. Extension is also utilized in this application as configuring the creation of the data packet in an extended state. Referring specifically to data packets 8B, 8C and 8D, the extendable headers 14B, 14C and 14D are extended such that the payload information bits 12B, 12C and 12D are contained within the payload information fields 18B, 18C and 18D of the headers 14B, 14C and 14D.

In order to provide policing functions, in addition to a plethora of other functionality, the payload information bits 12B, 12C and 12D may include a content serial number. A content serial number is a unique identification describing the contents of the payload 10A, 10B, 10C and 10D. Normally, these content serial numbers will be created by an industry to standardize the meaning of the numbers chosen. In this manner, networking devices can be configured to listen for payload information bits 12B, 12C and 12D contained within the extendable headers 14B, 14C and 14D. The networking devices can thus become involved in making decisions about the transfer and manipulation of the information. Furthermore, the networking devices can inform other systems of the presence of certain types of information. Thus, this data packet configuration provides a method of policing piracy. If certain media content is being transferred from one system to another a networking device can be configured to listen for payload information bits 12B, 12C and 12D within the extendable headers 14B, 14C and 14D. In this manner, appropriate systems can be informed of the transfer and determine whether the transfer was authorized.

Payload information bits may also include a MAC address. A MAC address is a number provided to a networking device by the manufacturer of the networking device. The number consists of 48 bits and is always unique to the specific piece of equipment. By providing the MAC address within the payload information bits 12B, 12C and 12D, the MAC address will indicate the source of the content. This eliminates the anonymity of the web and permits the tracking of a message to a particular source.

Figure 3:
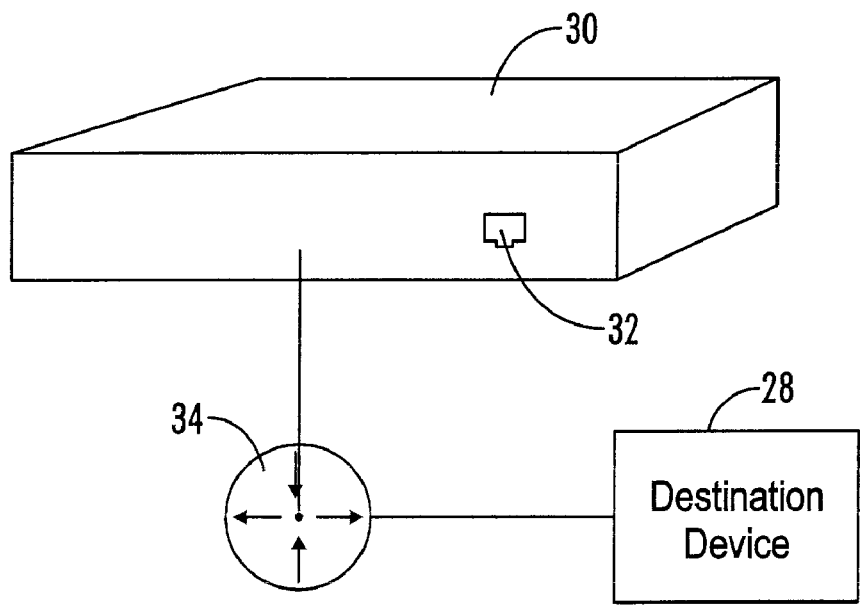
FIG. 3 is an illustration of a system for utilizing a data packet with an extendable header containing payload information bits.

To illustrate an example of the utilization of the data packets 8B, 8C and 8D, and extendable headers 14B, 14C and 14D with payload information bits 12B, 12C and 12D, the payload information bits 12B, 12C and 12D can be utilized to determine a priority of transmission for the data packets 8B, 8C and 8D according to the payload information bits 12B, 12C and 12D. Referring now to FIG. 3, the data packet 8 is transmitted for transmission to a destination device 28. In most instances, the data packet 8 is received at an intermediary network device 30. Intermediary network is any device which provides functionality for getting the data packet 8 to the destination device 28. Such devices include servers, routers, hubs, and switches. Once received at an intermediary network device 30, the contents of the data packet 8 are determined from the payload information bits 12. Thus, as an example, if the payload information bits 12 contain a content serial number, the device can determine a priority of transmission according to the contents of the payload 10. After a priority of transmission is determined, the data packet 8 is transmitted from the intermediary network device 30 for transmission to the destination source 28 according to the priority of transmission.

Specifically, the payload 10 of the data packet 8 may contain audio-video content. The payload information bits thus may contain a content serial number indicating that the payload 10 contains audio-video content and also a MAC address indicating the source of the audio-video content. In this manner, according to the source of the audio-video content and the fact that the device is transmitting audio-video content, the device can set a high priority for transmission of the information. This is particularly important in the transfer of audio-video content since asynchronous delivery of the information results in inappropriate delivery of the information.

As another example of the utilization of the data packet, one can determine whether to forward the data packet 8 to the destination device 28 according to the payload information bits 12. Thus, again, one would transmit the data packet 8 for transmission to a destination device 28. An intermediary network device 30 would receive the data packet 8. Payload information bits 12 would be extracted from the extendable header 14. The data packet 8 would be transmitted from the intermediary network device to the destination device if forwarding is appropriate. For example, one may be reading the payload information bits 12 to determine the contents of the payload 10. If the payload 10 is a copyrighted song, a determination of whether the transfer is authorized can be determined before the transfer is made. Thus the transfer of any private or proprietary information can be controlled through the utilization of the data packet 8.

Of course, devices not configured to listen for payload information bits 12 within the extendable header 14 will simply ignore these fields and transfer the data packet without reference to the additional information. However, to achieve the functionality desired in this application a device will need to be configured to listen for the payload information bits 12 within the extendable header 14. Referring now to FIG. 3 this device will normally require a port 32 for receiving the data packet 8 and a packet processor 34. The packet processor is configured to extract the payload information bits 12 from the extendable header 14. One method of configuring the packet processor 34 is by providing a gateway with a group of content switches that will be configured to look for the payload information fields 18 within the extendable header 14. In the preferred embodiment, the packet processor 34 is capable of setting up priority of transmission according to the payload information bits 12. In addition, the packet processor 34 can make forwarding decisions based on the payload information bits 12.

Figure 2:
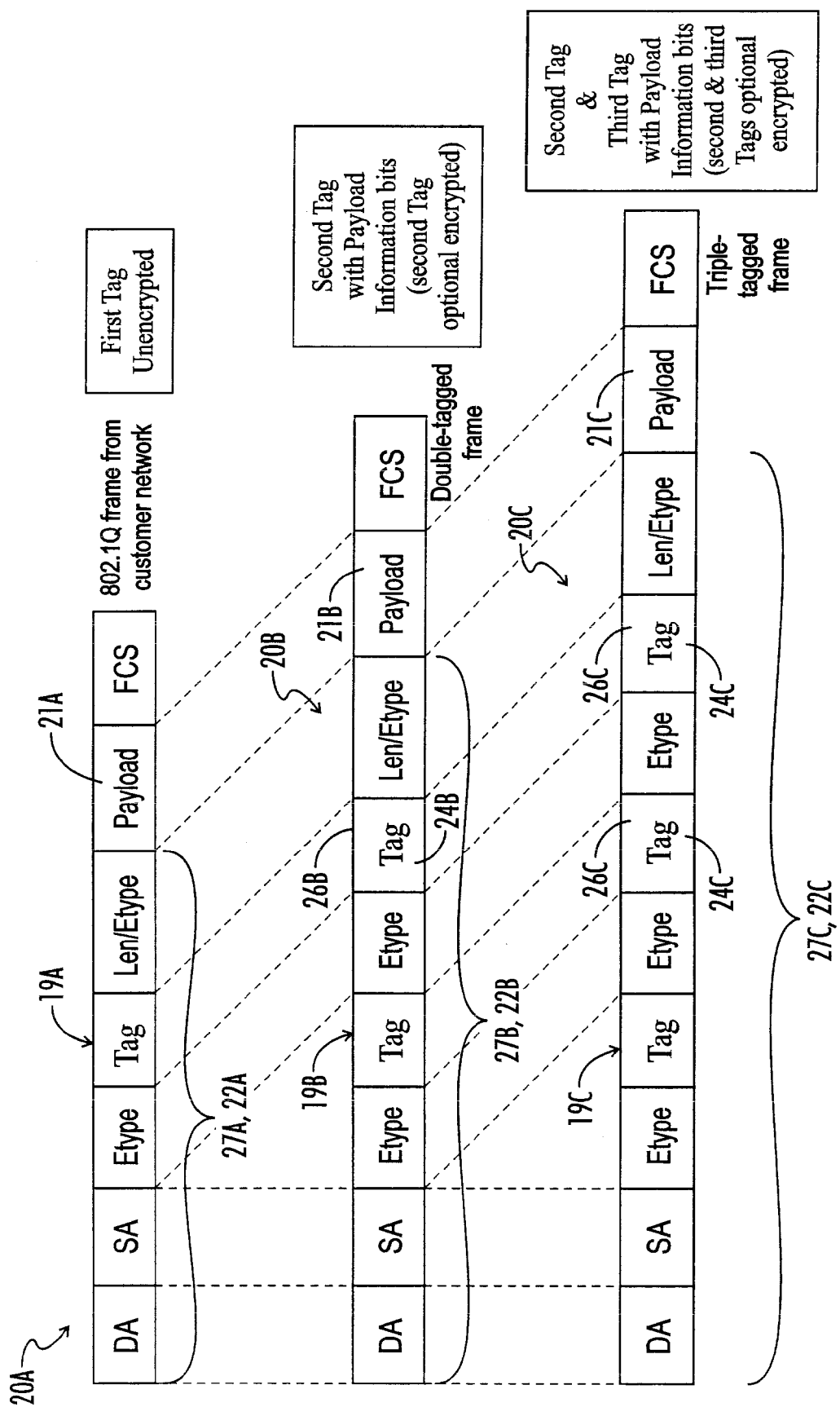
FIG. 2 is a data packet with a tagged frame formatted according to the IEEE 802.1Q protocol. The first line of FIG. 2 shows a data packet with a tagged frame formatted according to the IEEE 802.1Q protocol without any additional tags. The second line of FIG. 2 shows a data packet with a tagged frame formatted according to the IEEE 802.1Q protocol after having added an extra tag. The third line of FIG. 2 shows a data packet with a tagged frame formatted according to the IEEE 802.1Q protocol having added yet another tag.

Referring now to FIG. 2, a specific embodiment of the invention formatted according to the IEEE 802.1Q is shown. As discussed previously, data packets 20A, 20B and 20C contain extendable headers 27A, 27B and 27C and payload 21A, 21B, and 21C. Headers 27A and 27B of data packet 20 are extendable because IEEE 802.1Q allows for providing tag frames 22A, 22B and 22C for data packets 20A, 20B and 20C. Normally, tag frames 22A, 22B and 22C are utilized to specify a location in a virtual local area network. Consequently, in any data packet formatted according to the IEEE 802.1Q the first tag 19A, 19B and 19C must contain a VLAN ID, not payload information bits. This VLAN ID specifies a particular system in the virtual local area network. However, this VLAN ID is limited to a certain number of bytes and thus the IEEE 802.1Q extendable header format was provided in order to allow for additional tags so that systems containing more nodes than are available for identification by a single VLAN ID could be specified. However, instead of utilizing the tags to specify a system on a virtual local area network, this invention proposes utilizing the additional tags to contain payload information bits 26B and 26C. Thus, the data packets 20B and 20C are configured with sufficient additional tags 24B and 24C to contain the payload information bits 26B and 26C. The payload information bits 26B and 26C are provided within the additional tags 24.

Figure 4:
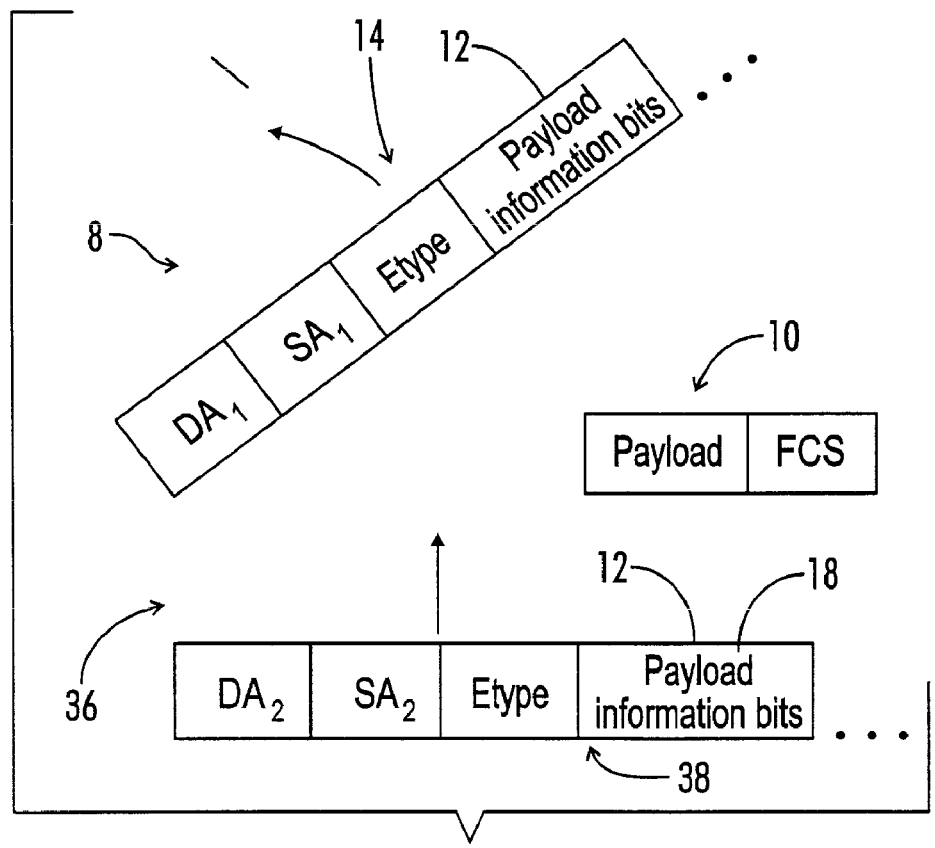
FIG. 4 is an illustration of an intermediary network device transferring information to a destination device.

Referring now to FIGS. 3 and 4, a method of transmitting the data packet 8 from the intermediary network device 30 to the destination device 28 is shown. In normal circumstances, intermediary networking device 30 removes the extendable header 14 from the data packet 8 in order to process routing for the device. In order to transfer the information, the intermediary network device 30 creates a second transmission data packet 36 which has a second extendable header 38 and the payload 10, and is the data packet transmitted from the device. This second extendable header 38 is also extended such that the payload information bits 12 fit within the second extendable header 38. The payload information bits 12 are also provided within the second extendable header 38. In this manner the information is transmitted, by transmitting the transmission data packet 36 from the intermediary network device 30.

Thus, although there have been described particular embodiments of the present invention of a new and useful Data Packet, Method, And Device Of Transmitting Payload Information Within An Extendable Header, it is not intended that such references be construed as limitations upon the scope of this invention except as set forth in the following claims.

What is claimed is:

1. A method comprising:
   providing payload information within a data packet;
   creating the data packet wherein the data packet has an extendable header and a payload;
   extending within the extendible header, the header such that payload information bits fit within the header;
   providing the payload information bits within the header; wherein said payload information bits include an identification of a file type of a payload, further wherein the payload information bits include the copyright status of a content of the payload; and
   determining whether to transmit the data packet to a destination device based on the copyright status.

2. The method of claim 1, further comprising:
   transmitting the data packet for transmission to a destination device;
   receiving the data packet at an intermediary network device;
   determining the contents of the data packet from the payload information bits;
   determining a priority of transmission for the data packet according to the payload information bits; and
   transmitting the data packet from the intermediary network device for transmission to the destination device according to the priority of transmission.

3. The method of claim 2, wherein transmitting the data packet from the intermediary network device for transmission to the destination device according to the priority, further comprises:
   creating a transmission data packet wherein the transmission data packet has a second extendable header and the payload;
   extending within the extendible header, the second extendable header such that the payload information bits fit within the second extendable header;
   providing the payload information bits within the second extendable header; and
   transmitting the transmission data packet from the intermediary network device according to the priority of transmission.

4. The method of claim 1 wherein the payload information bits include a content serial number.

5. The method of claim 1 wherein the payload information bits include a MAC address.

6. The method of claim 5 wherein the payload information bits further include a content serial number.

7. The method of claim 6 wherein the payload of the data packet contains audio/video content such that the content serial number indicates that the payload contains audio/video content and the MAC address indicates the source of the audio/video content.

8. The method of claim 7, further comprising:
   transmitting the data packet for transmission of the payload to a destination device;
   receiving the data packet at an intermediary network device;
   determining that the data packet contains audio/video content from the content serial number;
   determining a priority of transmission for the data packet according to the payload information bits; and
   transmitting the data packet from the intermediary network device for transmission to the destination device according to the priority of transmission.

9. The method of claim 8, wherein transmitting the data packet from the intermediary network device for transmission to the destination device according to the priority of transmission further comprises:
   creating a transmission data packet wherein the transmission data packet has a second extendable header and the payload;
   extending within the extendible header, the header such that the payload information bits fit within the second extendable header;
   providing the payload information bits within the second extendable header; and
   transmitting the transmission data packet according to the priority of transmission.

10. The method of claim 1, further comprising:
   transmitting the data packet for transmission to a destination device;
   receiving the data packet at an intermediary network device;
   extracting the payload information bits;
   determining whether to forward the data packet according to the payload information bits; and transmitting the data packet for transmission from the intermediary network device to the destination device if forwarding is appropriate.

11. The method of claim 10, wherein transmitting the data packet for transmission from the intermediary network device to the destination device if forwarding is appropriate, further comprises:
creating a transmission data packet wherein the transmission data packet has a second extendable header and the payload;
extending within the extendible header, the second extendable header such that the payload information bits fit within the second extendable header;
providing the payload information bits within the second extendable header; and
transmitting the transmission data packet from the intermediary network device if forwarding is appropriate.

12. A method comprising:
providing payload information within a data packet;
creating the data packet formatted according to the IEEE 802.1Q protocol wherein the data packet contains an extendable header and a payload;
providing a tagged frame for the data packet such that a first tag is created containing a VLAN ID; and
configuring the data packet with sufficient additional tags to contain payload information bits;
providing the payload information bits within the additional tags; wherein said payload information bits include an identification of a file type of a payload, further wherein the payload information bits include the copyright status of a content of the payload; and
determining whether to transmit the data packet to a destination device based on the copyright status.

13. The method of claim 12, further comprising:
transmitting the data packet for transmission to a destination device;
receiving the data packet at an intermediary device;
extracting the payload information bits from the additional tags;
determining a priority of transmission for the data packet according to the payload information bits; and
transmitting the data packet for transmission from the intermediary network device to the destination device according to the priority of transmission.

14. The method of claim 13, wherein transmitting the data packet for transmission from the intermediary network device to the destination device according to the priority of transmission further comprises:
creating a transmission data packet formatted according to the IEEE 802.1Q protocol wherein the transmission data packet contains a second extendable header and the payload;
providing a second tagged frame for the data packet such that a first transmission tag of the transmission data packet is created containing the VLAN ID; and
configuring transmission data packet with sufficient additional transmission tags to contain payload information bits.
providing the payload information bits within the additional transmission tags of the transmission data packet; and
transmitting the transmission data packet from the intermediary network device according to the priority of transmission.

15. The method of claim 12 wherein the payload information bits include a content serial number.

16. The method of claim 12 wherein the payload information bits include a MAC address.

17. The method of claim 16 wherein the payload information bits further include a content serial number.

18. The method of claim 17 wherein the payload of the data packet contains audio/video content such that the content serial number indicates that the payload contains audio/video content and the MAC address indicates the source of the audio/video content.

19. The method of claim 18, further comprising:
transmitting the data packet for transmission to a destination device;
receiving the data packet at an intermediary device;
extracting the payload information bits from the additional tags;
determining a priority of transmission for the data packet according to the payload information bits; and
transmitting the data packet for transmission from the intermediary network device to the destination device according to the priority of transmission.

20. The method of claim 12, further comprising:
transmitting the data packet for transmission to a destination device;
receiving the data packet at an intermediary network device;
extracting the payload information bits;
determining whether to forward the data packet according to the payload information bits; and
transmitting the data packet for transmission from the intermediary network device to the destination device if forwarding is appropriate.

21. The method of claim 20, wherein transmitting the data packet for transmission from the intermediary network device to the destination device if forwarding is appropriate further comprises:
creating a transmission data packet formatted according to the IEEE 802.1Q protocol wherein the transmission data packet contains a second extendable header and the payload;
providing a second tagged frame for the data packet such that a first transmission tag of the transmission data packet is created containing the VLAN ID; and
configuring transmission data packet with sufficient additional transmission tags to contain payload information bits;
providing the payload information bits within the additional transmission tags of the transmission data packet; and
transmitting the transmission data packet for transmission from the intermediary network device if forwarding is appropriate.

22. A networking device for receiving a data packet with an extendable header and a payload, wherein the data packet comprises:
a payload;
payload information bits; and
an extendable header having at least one packet handling field which contains bits for transmitting the data packet and at least one payload information field for containing the payload information bits wherein the extendable header is extended such that the payload information bits can be contained within the header; providing the payload information bits within the header; wherein said payload information bits include an identification of a file type of a payload, further wherein the payload information bits include the copyright status of a content of the payload; wherein determining whether to transmit the data packet to a destination device is based on the copyright status.

23. The data packet of claim 22 wherein the payload information bits include a content serial number.

24. The data packet of claim 22 wherein the payload information bits include a MAC address.

25. The data packet of claim 24 wherein the payload information bits further include a content serial number.

26. The data packet of claim 25 wherein the payload of the data packet contains audio/video content such that the content serial number indicates that the payload contains audio/video content and the MAC address indicates the source of the audio/video content.

27. A networking device for receiving a data packet with an extendable header and a payload, wherein the data packet comprises:
   IEEE 802.1Q protocol formatting with a tagged frame;
   at least one extra tag in the extendable header; and
   payload information bits wherein the extendable header is extended with sufficient extra tags to contain the payload information bits; wherein said payload information bits include an identification of a file type of a payload, further wherein the payload information bits include the copyright status of a content of the payload; wherein determining whether to transmit the data packet to a destination device is based on the copyright status.

28. The data packet of claim 27 wherein the payload information bits include a content serial number.

29. The data packet of claim 27 wherein the payload information bits include a MAC address.

30. The data packet of claim 29 wherein the payload information bits further include a content serial number.

31. The data packet of claim 30 wherein the payload of the data packet contains audio/video content such that the content serial number indicates that the payload contains audio/video content and the MAC address indicates the source of the audio/video content.

32. A networking device for receiving a data packet with an extendable header and a payload wherein the extendable header is extended to contain payload information bits, wherein the networking device comprises:
   a port for receiving the data packet; and
   a packet processor being configured to extract the payload information bits from the extendable header; wherein said payload information bits include an identification of a file type of a payload,
   further wherein the payload information bits include the copyright status of a content of the payload; wherein determining whether to transmit the data packet to a destination device is based on the copyright status.

33. The networking device of claim 32 wherein the packet processor is capable of setting a priority of transmission according to the payload information bits.

34. The networking device of claim 32 wherein the packet processor is capable of making forwarding decisions based on the payload information bits.

* * * * *